US011658800B2

(12) United States Patent
Blatt

(10) Patent No.: US 11,658,800 B2
(45) Date of Patent: May 23, 2023

(54) PRIVACY PRESERVING ROUTING

(71) Applicant: Duality Technologies, Inc., Maplewood, NJ (US)

(72) Inventor: Marcelo Blatt, Modiin (IL)

(73) Assignee: Duality Technologies, Inc., Maplewood, NJ (US)

( * ) Notice: Subject to any disclaimer, the term of this patent is extended or adjusted under 35 U.S.C. 154(b) by 73 days.

(21) Appl. No.: 17/337,977

(22) Filed: Jun. 3, 2021

(65) Prior Publication Data

US 2021/0399983 A1    Dec. 23, 2021

Related U.S. Application Data

(60) Provisional application No. 63/041,245, filed on Jun. 19, 2020.

(51) Int. Cl.
| | |
|---|---|
| *H04L 9/08* | (2006.01) |
| *H04L 9/00* | (2022.01) |
| *H04L 9/32* | (2006.01) |
| *H04L 9/40* | (2022.01) |
| *H04W 12/102* | (2021.01) |

(Continued)

(52) U.S. Cl.
CPC ............ *H04L 9/008* (2013.01); *H04L 9/0819* (2013.01); *H04L 9/0894* (2013.01);
(Continued)

(58) Field of Classification Search
CPC ......... H04L 9/08; H04L 9/008; H04L 9/0819; H04L 9/0894; H04L 9/32; H04L 9/3236;
(Continued)

(56) References Cited

U.S. PATENT DOCUMENTS

| | | | |
|---|---|---|---|
| 10,181,049 B1 * | 1/2019 | El Defrawy | ............ H04L 9/085 |
| 10,532,268 B2 | 1/2020 | Tran et al. | |
| 10,887,100 B2 * | 1/2021 | Wentz | ...................... H04L 9/085 |

(Continued)

OTHER PUBLICATIONS

Gahi, Youssef, et al. "On the use of Homomorphic Encryption to Secure Applications, Services, and Routing Protocols." *European Journal of Scientific Research* 88.3 (2012): 416-438.

(Continued)

*Primary Examiner* — Shaqueal D Wade-Wright
(74) *Attorney, Agent, or Firm* — Pearl Cohen Zedek Latzer Baratz LLP

(57) ABSTRACT

A system, method, and non-transitory computer readable storage medium for privacy preserving routing of a data packet. The data packet may comprise a packet header and a data payload; the packet header comprising at least a homomorphically encrypted final destination address of a final destination device. An intermediate routing device may receive the data packet. At the intermediate routing device, in a non-TEE, homomorphic computations may be performed to determine a homomorphically encrypted address of a next intermediate routing device. At the intermediate routing device, in a TEE, one or more secret homomorphic decryption keys may be stored and used to decrypt the homomorphically encrypted address of the next address of the next intermediate routing device. The data packet may be transmitted to the decrypted address of the next intermediate routing device according to an updated packet header with the unencrypted address of the next intermediate routing device in the sequence.

20 Claims, 4 Drawing Sheets

(51) Int. Cl.
*H04W 12/106* (2021.01)
*H04W 12/10* (2021.01)

(52) U.S. Cl.
CPC ............ *H04L 9/3236* (2013.01); *H04L 63/06* (2013.01); *H04W 12/10* (2013.01); *H04W 12/102* (2021.01); *H04W 12/106* (2021.01); *H04L 63/0407* (2013.01); *H04L 63/0421* (2013.01)

(58) Field of Classification Search
CPC ....... H04L 9/0897; H04L 63/06; H04L 63/04; H04L 63/0407; H04L 63/0421; H04W 12/00; H04W 12/009; H04W 12/02; H04W 12/03; H04W 12/10; H04W 12/102; H04W 12/106
See application file for complete search history.

(56) References Cited

U.S. PATENT DOCUMENTS

| | | | | |
|---|---|---|---|---|
| 2021/0119765 A1* | 4/2021 | Jankly | ................ | H04L 63/0428 |
| 2021/0336770 A1* | 10/2021 | Ahmed | ................... | H04L 9/085 |
| 2022/0124074 A1* | 4/2022 | Petri | ................... | H04L 63/0485 |
| 2022/0140997 A1* | 5/2022 | Lam | ....................... | G06F 7/588 |
| | | | | 713/168 |

OTHER PUBLICATIONS

Gahi, Youssef, et al. "An encrypted trust-based routing protocol." *2012 IEEE Conference on Open Systems*. IEEE, 2012.

* cited by examiner

PRIVACY PRESERVING ROUTING

CROSS-REFERENCE TO RELATED APPLICATIONS

This application claims the benefit of U.S. Provisional Patent Application Ser. No. 63/041,245, filed on Jun. 19, 2020, which is hereby incorporated by reference in its entirety.

FIELD OF THE INVENTION

Embodiments of the invention are directed to network routing, such as Internet Protocol (IP) routing, data privacy, security, and homomorphic encryption of secret data.

BACKGROUND OF THE INVENTION

A network routes data packets, such as IP packets, from a source address, forwarded through a sequence of intermediate nodes, to a final destination address. Dynamic routing protocols, such as General Packet Radio Service (GPRS), select the best path of nodes to reach the final destination address. Each intermediate node along the path determines the next forwarding node in the sequence by analyzing routing data in the received packet's header. Each node may look up the routing header data (e.g., source address, previous or other intermediate node address(es), final destination address, etc.) in a routing table to determine the address of the optimal next node in the routing sequence.

Conventional cryptosystems encrypt the payloads of data packet that contain private information (e.g., images, videos, etc.) to protect them from exposure to malicious parties. However, the routing address data itself in the packet header is left unencrypted so that the addresses can be recognized by the intermediate nodes in order to route the data packets. This unencrypted routing data, such as, source, final destination and/or intermediate node addresses, may leave systems vulnerable to malicious party attacks, such as, "man in the middle attacks." For example, knowledge of routing addresses may leave systems vulnerable to an intermediary intercepting data packets and rerouting, blocking, or modifying content of the packets. Attacks may include spoofing, in which a malicious party impersonates an authentic sender to gain trust and access to an unknowing destination party. Other attacks may track data flow to/from addresses and deduce a source and/or final destination address to compromise their security.

Unencrypted routing data in packet headers leaves conventional network routing vulnerable to attacks. Accordingly, there is a long felt need in the art for secure network routing that eliminates or minimizes exposure of routing addresses.

SUMMARY OF EMBODIMENTS OF THE INVENTION

Embodiments of the invention solve the aforementioned problems inherent in the art by routing data packets in homomorphically encrypted space. Packet header routing data, such as, source, final destination and/or intermediate forwarding node addresses, may be homomorphically encrypted so they are undecipherable to nondesignated parties that do not possess an associated secret key, while still allowing routing computations to be executed on the encrypted data using homomorphic computations. Embodiments of the invention may input homomorphically encrypted packet header routing data (e.g., a final destination IP address), perform homomorphic routing computations thereon (e.g., searching a HE routing table), and output an encrypted routing decision that is a homomorphically encrypted address of the next node to forward the data packet in the routing sequence. To ultimately route the data packet, the homomorphically encrypted next node address is sent to a secure location in the current node (e.g., a trusted execution environment (TEE)) where it is decrypted using the associated secret key to reveal the next node to be routed. Only the address of the next node of the current forwarding step in the routing sequence is ever decrypted at any time, so that if the data packet were intercepted, the source and final destination addresses, as well as prior or future intermediate node addresses, would not be revealed, thereby improving routing security.

Embodiments of the invention may further improve routing speed and efficiency by designating computationally intensive routing computations to be executed in homomorphically encrypted space by main system processor(s) and memor(ies) in a non-trusted execution environment (non-TEE), which typically have significantly greater resources (e.g., multiprocessors) compared to the TEE, and designating minimal computations of decrypting the homomorphically encrypted result of the next node address in unencrypted space at secure processor(s) and memor(ies) in the TEE, which typically has significantly limited resources compared to the main non-TEE hardware. Shifting the bulk of the routing computations to the main non-TEE system may divert time-consuming computations away from the limited resources of the secure TEE to avoid a computational bottleneck, thereby increasing routing computations and transmission speeds. Because the main non-TEE system operates in the homomorphically encrypted space, privacy is preserved.

In an embodiment of the invention, a system, method, and non-transitory computer readable storage medium is provided for privacy preserving routing of a data packet originating at a source device, forwarded through a sequence of intermediate routing devices, and destined to terminate at a final destination device. One of the intermediate routing devices may receive the data packet comprising a packet header and a data payload. The packet header may comprise at least a final destination address of the final destination device that may be homomorphically encrypted by one or more public homomorphic encryption keys. At the one of the intermediate routing devices, in a non-trusted execution environment (non-TEE), embodiments of the invention may perform homomorphic computations on the homomorphically encrypted final destination address in homomorphically encrypted space to determine a homomorphically encrypted address of a next intermediate routing device in the sequence to route the data packet. At the one of the intermediate routing devices, in a trusted execution environment (TEE), embodiments of the invention may store one or more secret homomorphic decryption keys. At the one of the intermediate routing devices, at the TEE, embodiments of the invention may decrypt the homomorphically encrypted address of the next intermediate routing device in the sequence to generate an unencrypted address of the next intermediate routing device. At the one of the intermediate routing devices, embodiments of the invention may transmit the data packet to the decrypted address of the next intermediate routing device according to an updated packet header with the unencrypted address of the next intermediate routing device in the sequence.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
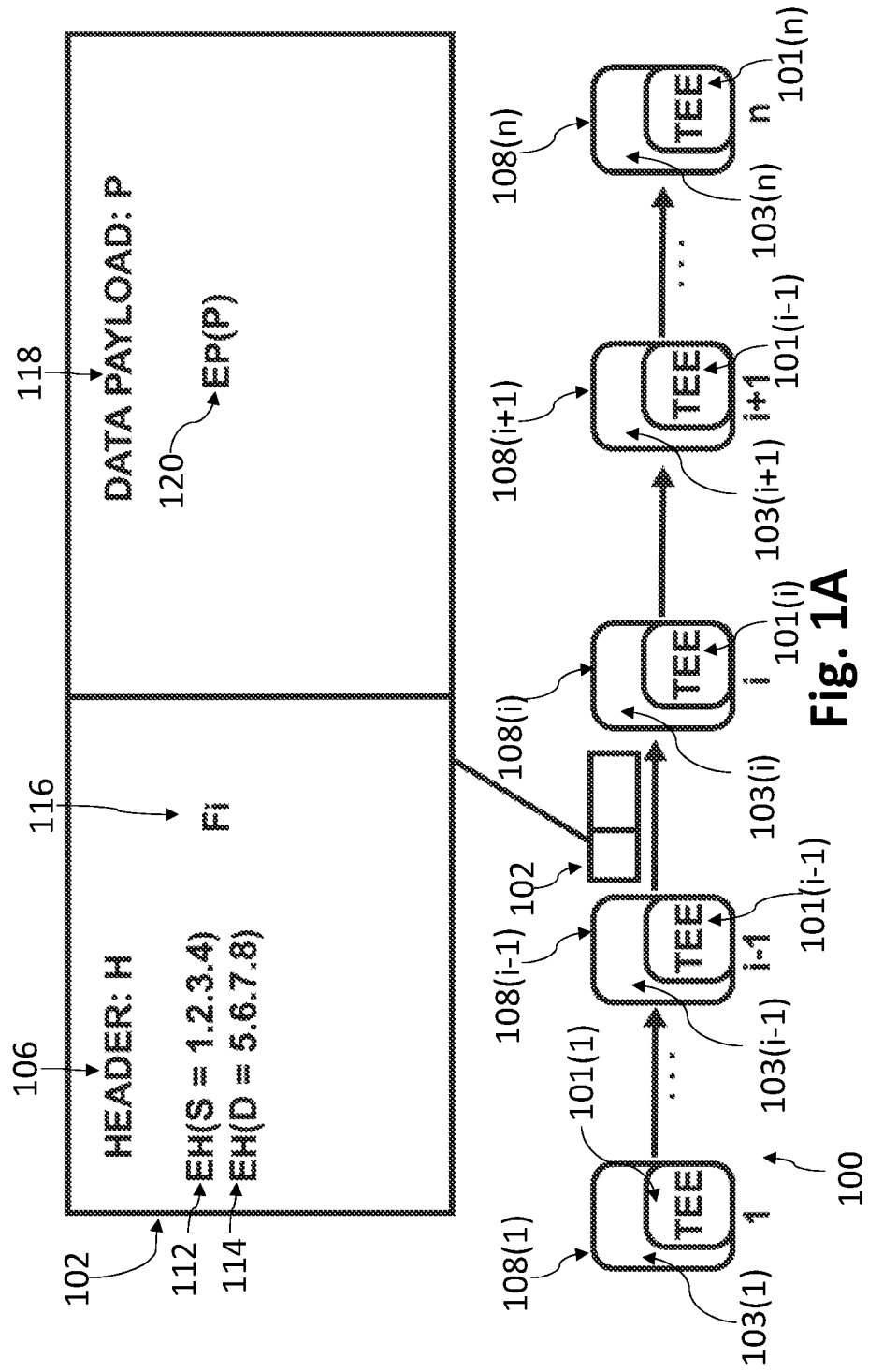
FIG. 1A schematically illustrates a network for privacy preserving routing of a data packet, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

To overcome the aforementioned problems inherent in the art, embodiments of the invention provide secure network routing in homomorphically encrypted space with minimal exposure of routing addresses. In each data packet, the packet header (as a whole) or one or more individual addresses therein may be independently encrypted using one or more public homomorphic encryption (HE) key(s). HE allows computations to be performed over encrypted data, without revealing underlying data or computational results. Accordingly, routing computations may be performed on the HE header address(es) (e.g., final destination IP address), without exposing the address(es), to generate a secure routing decision that is an encrypted address of an optimal next node to which a packet may be intermediately routed. The routing decision may determine the optimal next node, such that the data packet, individually or collectively with other routed packets, may reach its final destination address in a relatively minimal or optimal amount of time, with a minimal or below threshold transmission delay or risk of dropped packets, or other routing considerations. To execute the routing decision, each node may input the encrypted header address data (e.g., final destination IP address), perform HE routing computations on the encrypted header address data, and output the encrypted optimal intermediate forwarding address without exposing any plaintext data. HE routing computations may include searching a HE routing table, performing a routing function, performing a heuristic determination, and/or any other known routing analysis based on the encrypted header address(es). The HE routing computations may weight many routing factors, e.g., all or a subset of candidate next nodes in a network, network traffic, packet importance, transmission standards such as dropped packet rates and transmission timeout intervals, routing to predetermined nodes or along predetermined paths, routing using a maximum number of nodes, or any other routing protocol information. The optimal next node may be dynamically selected in real-time (e.g., on-the-fly) on a node-by-node basis (e.g., in dynamic routing, such as, packet-switched networks) or may be selected before initiating routing of a packet such that a routing path or paths are predetermined (e.g., in circuit-switched routing). For example, in the case of dynamic routing, a HE encrypted optimal intermediate forwarding address corresponding to next node i+1 in a sequence of nodes may be computed at, and after the packet is transmitted to, current node i.

Once the routing decision is completed in HE space, the current node i possessing the packet may only have the secret key to decrypt the routing decision of the encrypted optimal intermediate forwarding address of the next node i+1, but not the secret key(s) to decrypt or reveal the address of any other node 1, 2, . . . , i−1, (i,) i+2, . . . N, including the source or destination addresses. According to some embodiments, each node in the routing path comprises a trusted execution environment (TEE). A TEE is an isolated execution environment with specialized hardware and/or software, separate from the main (non-TEE) system hardware and/or software, which provides security features e.g., isolated execution, integrity of applications, and confidentiality of data. The TEE may securely store the secret homomorphic decryption key(s) corresponding to the public HE key(s), such that, the secret key cannot be accessed outside the TEE, e.g., by the main non-TEE processor or memory of the same device or by other devices. The TEE of a particular node i uses the secret HE key(s) to decrypt the encrypted intermediate forwarding address of the next node i+1 in the routing sequence. The encrypted optimal next node address may thus be unencrypted in plaintext form and entered into the forwarding address field to update the packet header (e.g., by the TEE or main system processor). Each node in the network may be encrypted by the same or different public HE keys and may use the same or different secret keys to decrypt their respective next node addresses. Different keys may be applied without decrypting the addresses, e.g., through proxy re-encryption. In the case of different secret keys, the current node (or next node) may re-encrypt (in the TEE) or proxy re-encrypt (in the TEE or non-TEE) the header data with the corresponding different public keys before (or after) transmission to the next node. When different keys are used for the source and final destination addresses as are used for the next node address, the current node may store only the secret key to decrypt the next node address, but not the source and final destination addresses. Thus, no intermediate node (or all but the last N−1th intermediate node which decrypts the final Nth destination address) can decrypt the source and/or final destination addresses, even in the TEE, for additional security.

Once the next node address is decrypted, the TEE may push that unencrypted next node address (e.g., individually or already integrated into the IP packet header) out of secure TEE to the current node's network routing hardware. The current node's network routing hardware may then transmit the packet with the entire header encrypted (as a whole or piecewise per address or information field), except the unencrypted next node address to be routed to the next node in the routing sequence.

This process may repeat to route the data packet to each of the plurality of intermediate nodes in the sequence until the packet reaches the node having the final destination address. At any time along this routing sequence, only the single address of the next node is unencrypted. If intercepted, the eavesdropping party would only know the next node address (an intermediate via point of relatively lower vulnerability to attack), but not the secret source and final destination addresses (generally most vulnerable to attack). Even at the final hop of the sequence, where the next node address is the final destination address, because only a next node header field is unencrypted, a malicious party would not know whether that next node is the final destination or an intermediary node, thereby maintaining the secrecy of its final destination status.

Embodiments of the invention may provide enhanced privacy of routing data and protection against network attacks (e.g., spoofing, interception, etc.) by performing routing decision computations of intermediate forwarding addresses entirely in HE space and thereby avoiding decryption and exposure of source and/or final destination addresses used in the routing decision. Only the forwarding address of the next routing hop may be decrypted in a TEE. In some embodiments, the TEE may wait or delay decryption or transmission of the unencrypted forwarding address until receiving a signal indicating a routing buffer or queue has a below threshold delay or the network routing hardware is ready (or near ready) to transmit the packet, thereby reducing the amount of waiting time the routing address is exposed outside of the TEE in its unencrypted state to minimize the potential for attack.

While enhancing security, HE computations require more computations and so, are typically slower and less efficient than equivalent computations on corresponding plaintext data. Thus, it may seem appealing to avoid HE computations by decrypting header routing data entirely in a TEE to perform routing decisions over plaintext header routing data. However, typical TEEs are specialized and expensive ancillary systems that have significantly smaller memories and slower processors than a system's main non-TEE memories and processors. Further, routing decisions are typically time-consuming due to the complexity of determining an optimal path out of many possible candidate nodes in a system and/or given a large number of factors (e.g., network traffic, packet priority, transmission standards, etc.). Performing such complex routing decisions at the TEE with limited resources would result in computational backlogs which in turn create network routing bottlenecks slowing network traffic. Embodiments of the invention may improve the efficiency of routing decisions and network traffic speed by performing the cumbersome routing decision computations at the main non-TEE processor and the minimal decryption of the optimal intermediate forwarding address at the limited resource TEE. The main processor may exploit its full resources to further increase efficiency, for example, using a multiprocessor to parallelize the HE routing decision computations (e.g., where the TEE does not have a multiprocessor). In the example of routing using an HE routing table, each processor of the main multiprocessor may perform computations over a sub-table of the routing lookup table for a divide and conquer approach. The routing table may be split e.g., into N sub-tables, each of which may be searched by a different respective one of N sub-processors, thereby increasing the speed of the routing decision by the number N of parallelized processors in the multiprocessor. The efficiency of the main non-TEE memories and processors may thus more than compensate for the inefficiencies of the HE computations, yielding a net improvement in routing decisions and network traffic speeds.

Some embodiments of the invention may provide additional privacy of routing data by encrypting or hashing the plaintext intermediate forwarding address before the TEE sends the address to network hardware, and/or before the network hardware broadcasts the packet. Correspondingly, only the next node to which a packet is intended to be routed (and not other network nodes) may possess the secret decryption key or secret hash code to determine if its address matches the broadcasted intermediate forwarding address to verify that it is indeed the intended recipient of the data packet. The data packet may thus be routed to the next node without exposing a plaintext intermediate forwarding address to parties who do not possess the secret decryption key or hash code.

Some embodiments of the invention may provide additional privacy and efficiency by dividing a complete address (e.g., intermediate forwarding, source and/or final destination addresses) into multiple atomic or sub-units representing parts of the address and independently homomorphically encrypting each of the one or more partial address atomic unit (e.g., using a different public HE key than the other atomic units or other header data). In this way, HE computations may only be performed on a minimum HE atomic unit defining a partial address needed to perform the routing decision, but not the full secret address (e.g., of the source, intermediate and/or destination node(s)). Thus, even if a malicious party obtained a secret HE key, it could only expose the partial address defined by the HE atomic unit encrypted by the corresponding public HE key, but not the full address (encrypted by other keys) necessary to identify the source and/or destination node(s). In one example, a plaintext final destination IP address comprises a 4-tuple such as 192.168.1.1 and may be homomorphically encrypted as $E1[192].E2[168].E3[1].E[1]$ where each $Ei[i]$ is an ith independent encryption of an ith address tuple by an ith public HE key. Each tuple may be used in a different routing decision or stage of the routing sequence and so only that HE atomic unit $Ei[i]$ is used in each routing stage. Thus, HE routing computations may only be performed over a select or minimal number of HE atomic units of encrypted addresses (e.g., a single tuple of a final destination IP address). Malicious party interception and even decrypting these HE atomic units defining partial addresses will not expose the entire addresses needed to attack the source or destination devices, thus further enhancing privacy.

Internet Protocol (IP) and IP addresses are discussed herein merely as non-limiting examples, and any other protocol or network and any other network address, identifier, location, or path may be used including, but not limited to Uniform Resource Locators (URLs) and MAC addresses.

Reference is made to FIG. 1A, which schematically illustrates a network 100 for privacy preserving routing of a data packet 102, according to some embodiments of the invention. Data packet 102 may originate at a source device 108(1), be forwarded through a sequence of intermediate routing devices 108($i$−1), 108($i$), 108($i$+1) and terminate at a final destination device 108($n$). Routing devices 108(1), . . . 108($i$−1), 108($i$), 108($i$+1), . . . 108($n$) may each comprise a trusted execution environment (TEE) 101(1), . . . 101($i$−1), 101($i$), 101($i$+1), . . . 101($n$), respectively, and main device hardware in a non-trusted execution environment (non-TEE) 103(1), . . . 103($i$−1), 103($i$), 103($i$+1), . . . 103($n$), respectively.

Data packet 102 may comprise a packet header 106 and data payload 118. To preserve routing privacy and protect against network attacks it may be desirable to adopt a homomorphic encryption scheme for data packets. Accordingly, packet header 106 may comprise an encrypted source address 112 of a source device 108(1) and/or an encrypted final destination address 114 of a final destination device 108(*n*) homomorphically encrypted by one or more public homomorphic encryption keys. Packet header 106 may also comprise an address 116 of an intermediate routing device 116 to which data packet 102 is forwarded in the routing sequence. Data payload 118 may be encrypted 120 (homomorphically or non-homomorphically) by one or more public encryption keys. In some embodiments, only the final destination device 108(*n*) that is the intended recipient of the data packet 102, and no other intermediate and/or source device, may possess the corresponding secret key to decrypt data payload 118. In the example of FIG. 1A, data packet 102 is forwarded from intermediate routing device 108(*i*−1) to next intermediate routing device 108(*i*).

According to some embodiments, a complete address (e.g., of an intermediate, source, and/or final routing device) may comprise N-tuple partial addresses. In the example of FIG. 1A, a source address and a final destination address are each represented by a four-tuple. In some scenarios, to provide a higher level of security, intermediate, source and/or final destination addresses may be divided into partial address atomic or sub-units that may be homomorphically encrypted independently from one another. For example, encrypted source address EH(S) 112 and encrypted destination address EH(D) 114 may comprise E1(1).E2(2). E3(3).E4(4) and E5(5).E6(6).E7(7).E8(8), respectively, where each E[j]j is a jth independent homomorphic encryption of a jth address tuple by a jth different HE key. Homomorphic encryption computations may be performed on partial address atomic units of a routing device address. This may provide enhanced protection from network attacks as exposure of routing device addresses in homomorphic computations may be limited to the partial routing device addresses such as E5(5), E6(6).E7(7), E1(1), and/or E3(3) .E4(4), but not the complete address that remains encrypted (homomorphically or non-homomorphically) in the header and not used in routing decision computations.

Figure 1B:
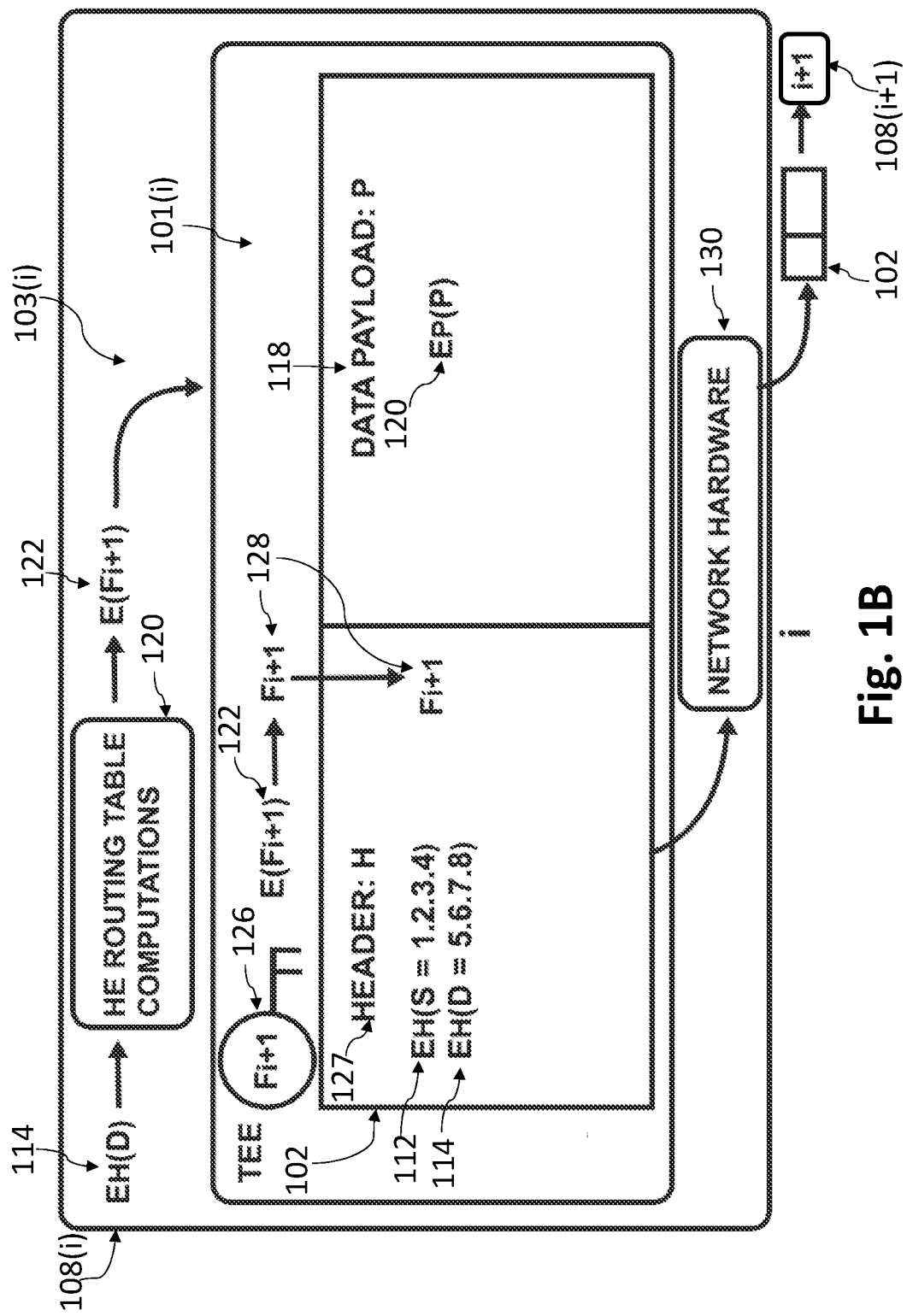
FIG. 1B schematically illustrates an intermediate routing device securely routing a data packet to a next intermediate routing device, according to some embodiments of the invention.

Reference is made to FIG. 1B, which schematically illustrates an intermediate routing device 108(*i*) securely routing a data packet 102 to a next intermediate routing device 108(*i*+1), according to some embodiments of the invention. Intermediate routing device 108(*i*) may perform routing decision computations to determine an address 122 of next intermediate routing device 108(*i*+1) in main device hardware 103(*i*) (e.g., processor(s) and memor(ies)). Main device hardware 103(*i*) may be configured in a non-TEE environment to increase efficiency relative to limited resource TEEs. To avoid exposure of source, intermediate and/or final destination addresses that may be used in routing computations, these computations may be performed entirely in HE space such that all sensitive data is homomorphically encrypted. Main non-TEE hardware 103(*i*) may perform homomorphic computations 120 (e.g., searching a homomorphically encrypted routing table) based on a homomorphically encrypted final destination address 114 to determine a homomorphically encrypted address 122 of next intermediate routing device 108(*i*+1).

In scenarios using partial address atomic units, main non-TEE hardware 103(*i*) memory may store a homomorphically encrypted partial final destination address, but not a complete final destination address in either encrypted or unencrypted form. A partial final destination address may be a minimum portion of a complete final destination address required to determine next intermediate routing device address 122.

To mitigate network vulnerabilities, next intermediate routing device address 122 (and no other addresses) may be decrypted at a TEE 101(*i*). TEE 101(*i*) may store one or more secret homomorphic decryption keys 126, e.g., unique for decrypting address 122. TEE 101(*i*) may decrypt homomorphically encrypted next intermediate routing device address 122 to generate an unencrypted address 128 of next intermediate routing device 108(*i*+1). TEE 101(*i*) may then generate updated packet header 127 of data packet 102 by replacing previous forwarding device 108(*i*) address 116 of FIG. 1A with the next forwarding device 108(*i*+1) address 128. According to some embodiments, encrypted final destination address 114 and encrypted next intermediate routing device address 122 may be encrypted with different respective one or more public encryption keys. A TEE 101(*i*) may correspondingly store one or more secret homomorphic decryption keys 126 that may be configured to decrypt encrypted next intermediate routing device address 122, but cannot decrypt encrypted final destination address 114.

TEE 101(*i*) may transfer unencrypted next intermediate routing device address 128 from its secure memory to network hardware 130. Network hardware 130 may comprise a transmission buffer to queue outbound packets, a transmission circuit, and an antenna (for wireless devices) to transmit packets. Network hardware 130 may then broadcast packet 102 with updated packet header 127 listing next intermediate routing device address 128 such that next intermediate routing device 100(*i*+1) may identify itself as the intended recipient. To enhance privacy, TEE 108(*i*) may minimize the amount of time that an address of a next intermediate routing device 128 may be exposed in decrypted form by delaying decryption of an encrypted address of a next intermediate routing device 122 and/or transfer of a decrypted address of a next intermediate routing device 128 to network hardware 130 until TEE 101(*i*) determines and/or receives a signal indicating there are no or below threshold transmitting delays or buffer backlog.

In some embodiments, TEE 101(*i*) may hash unencrypted next intermediate routing device address 128 in updated packet header 127 before transferring to network hardware 130 or before network hardware 130 transmits data packet 102. Network hardware 130 may then broadcast the hashed address of a next intermediate routing device. Next intermediate routing device 108(*i*+1) may possess a corresponding secret hash code to verify whether or not the received hashed address matches its own hashed address, indicating it is the intended recipient of data packet 102. Additionally or alternatively, the ith and i+1th intermediate routing device TEEs 101(*i*) and 101(*i*+1) may store different one or more secret homomorphic decryption keys. TEE 101(*i*) may encrypt next intermediate routing device address 128 in updated packet header 127 using the one or more public homomorphic encryption keys associated with the one or more secret homomorphic decryption keys stored at the next intermediate routing device TEE 101(*i*+1). TEE 101(*i*) may encrypt the unencrypted next intermediate routing device address 128, or may re-encrypt its encrypted form, so the unencrypted address is not revealed to intermediate routing device 108(*i*), even in TEE 101(*i*). By encrypting the forwarding address, no address, not even address 128 of the next routing device 108(*i*+1), is transmitted in unencrypted form. Accordingly, only the sole intended recipient, next routing device 108(*i*+1), with the secret key, may recognize the encrypted next node address as its own. Network hardware 130 may broadcast the encrypted and/or hashed address of next intermediate routing device such that it may use corresponding homomorphic decryption keys and/or hash codes to identify itself as the intended recipient. Hashing and/or encrypting intermediate routing device address 128 makes it comprehensible only to its intended recipient to further enhance routing security.

Figure 2:
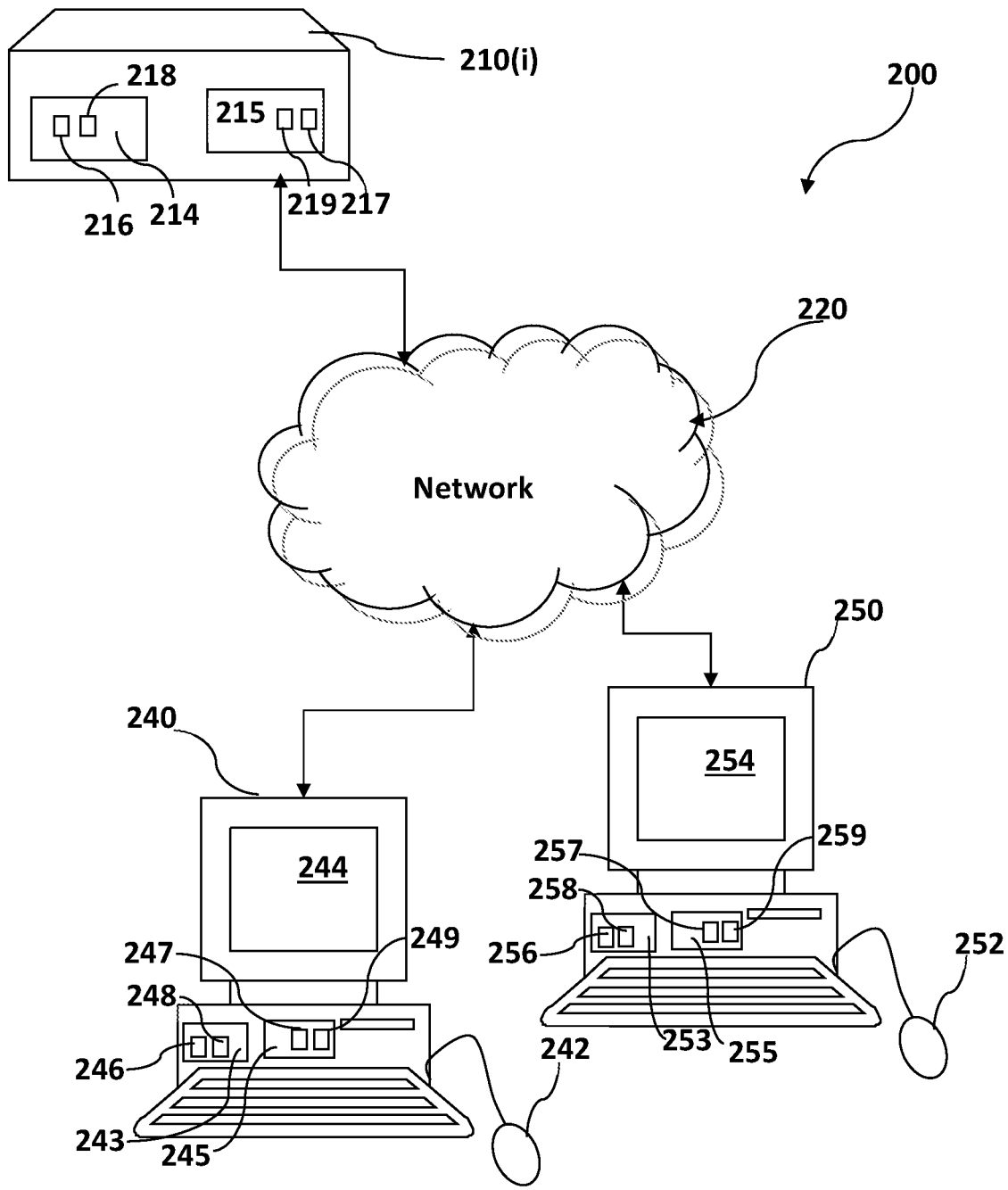
FIG. 2 is a system for privacy preserving routing, according to some embodiments of the invention.

Reference is made to FIG. 2, which schematically illustrates a system 200 for privacy preserving routing, according to some embodiments of the invention. System 200 may route a data packet (e.g., 102 of FIG. 1A and FIG. 1B) comprising a packet header (e.g., 106 of FIG. 1A) and a data payload (e.g., 118 of FIG. 1A and FIG. 1B). The packet header may comprise at least an encrypted final destination address of a final destination device (e.g., 114 of FIG. 1A) that is homomorphically encrypted by one or more public homomorphic encryption keys. System 200 may include a source device 240 from which a data packet may originate, a sequence of one or more intermediate routing devices 210 (an ith intermediate routing device pictured in FIG. 2) through which a data packet may be forwarded, and a final destination device 250 at which a data packet may terminate, all of which are connected via a network 220.

Source, final destination, and intermediate routing devices 240, 250, and 210, may each include a main non-trusted execution environment (non-TEE) 243, 253, and 214, respectively, and a trusted execution environment (TEE) 245, 255, and 215, respectively.

Intermediate routing devices 210 (e.g., 108(*i*) of FIG. 1A and FIG. 1B) may receive the data packet from source device 240 or another prior intermediate routing device 210 (e.g., 108(*i*−1) of FIG. 1A). Intermediate routing device 210 may store, at a respective non-TEE 214 (e.g., 103(*i*) of FIG. 1B), the homomorphically encrypted final destination address (e.g., 114 of FIG. 1B). Intermediate routing device 210 may perform, in non-TEE 214, homomorphic computations on the homomorphically encrypted final destination address in homomorphically encrypted space to determine a homomorphically encrypted address (e.g., 122 of FIG. 1B) of the next intermediate routing device (e.g., 108(*i*+1) of FIG. 1B) in the sequence to route the data packet. Intermediate routing device 210 may store, at TEE 215 (e.g., 101(*i*) of FIG. 1B), one or more secret homomorphic decryption keys (e.g., 126 of FIG. 1B). Intermediate routing device 210 may decrypt, at TEE 215, the homomorphically encrypted address of the next intermediate routing device in the sequence to generate an unencrypted address (e.g., 128 of FIG. 1B) of the next intermediate routing device. Additionally or alternatively, intermediate routing device 210 may hash, re-encrypt or proxy re-encrypt the next intermediate routing device address to transmit it in hashed or encrypted form. Intermediate routing device 210 may transmit the data packet to the decrypted address (e.g., 128 of FIG. 1B) of the next intermediate routing device according to an updated packet header (e.g., 127 of FIG. 1B) with an unencrypted address (or hashed or encrypted address) of a next intermediate routing device in a sequence.

Source, final destination, and intermediate routing devices 240, 250, and 210 may be servers, personal computers, desktop computers, mobile computers, laptop computers, and notebook computers or any other suitable device such as a smart device, cellular telephone, personal digital assistant (PDA), Internet of Things (IoT) device, video game console, etc., and may include wired or wireless connections or modems, or users operating such devices. Source and final destination devices 240 and 250 (and/or intermediate routing device 210, not shown) may include one or more input devices 242 and 252, respectively, for receiving input from a user (e.g., via a pointing device, click-wheel or mouse, keys, touch screen, recorder/microphone, other input components). Source and final destination devices 240 and 250 (and/or intermediate routing device 210, not shown) may include one or more output devices 244 and 254, respectively, (e.g., a monitor or screen) for displaying data to a user provided by or for intermediate routing devices 210.

Network 220, which connects intermediate routing devices 210 and source and final destination devices 240 and 250, may be any public or private network such as the Internet. Access to network 220 may be through wire line, terrestrial wireless, satellite or other systems well known in the art.

Source, final destination, and intermediate routing devices 240, 250, and 210 may include one or more controller(s) or processor(s) 246 in non-TEE 243 and 247 in TEE 245, 256 in non-TEE 253 and 257 in TEE 255, and 216 in non-TEE 214 and 219 in TEE 215, respectively, for executing operations according to embodiments of the invention and one or more memory unit(s) 248 in non-TEE 243 and 249 in TEE 245, 258 in non-TEE 253 and 259 in TEE 255, and 218 in non-TEE 214 and 217 in TEE 215, respectively, for storing data (e.g., keys and encrypted or decrypted data) and/or instructions (e.g., software for applying keys to encrypt or decrypt data, or performing HE computations over encrypted data, according to embodiments of the invention) executable by the processor(s). Processor(s) 246, 247, 256, 257, 216 and/or 219 may include, for example, a central processing unit (CPU), a digital signal processor (DSP), a microprocessor, a controller, a chip, a microchip, an integrated circuit (IC), or any other suitable multi-purpose or specific processor or controller. Memory unit(s) 248, 249, 258, 259, 218 and/or 217 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

According to some embodiments of the invention, other devices or combinations of devices may be used in system 200. Components from multiple different devices may be combined into a single device or components from a single device may be separated into multiple different devices that may also be used in system 200.

Figure 3:
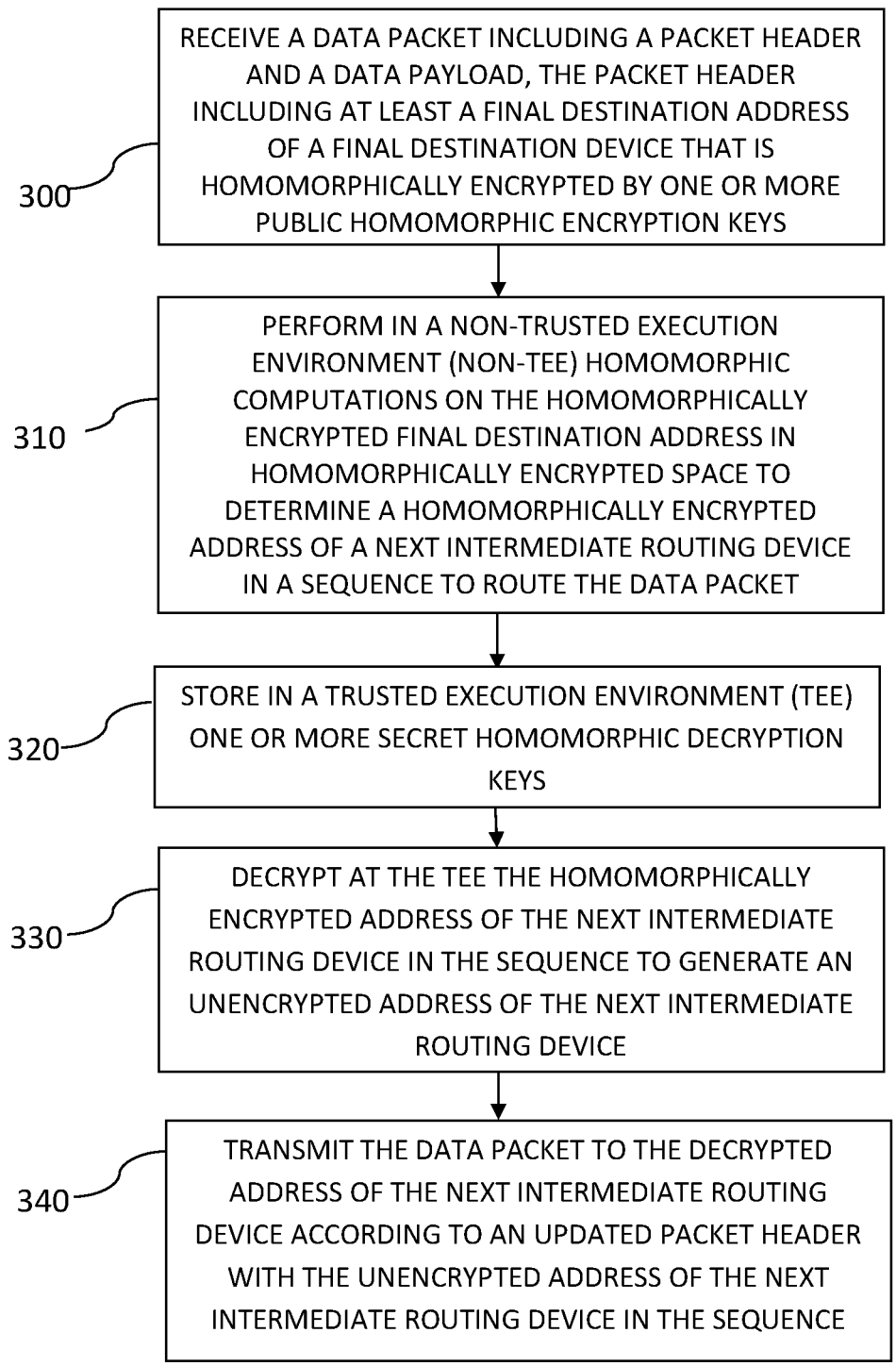
FIG. 3 is a flowchart of a method for privacy preserving routing, according to some embodiments of the invention.

Reference is made to FIG. 3, which schematically illustrates a flowchart of a method for privacy preserving routing, according to some embodiments of the invention. The method may securely route a data packet originating at a source device, forwarded through a sequence of intermediate routing devices, and destined to terminate at a final destination device. The operation(s) of FIG. 3 may be performed using devices or components disclosed in reference to the system of FIG. 2, using the network devices, and data structures disclosed in reference to FIG. 1A and/or FIG. 1B. For example, the operation(s) of FIG. 3 may be performed using one or more processors 216 and/or 219 of intermediate routing device 210 of FIG. 2. Other devices or systems may also be used.

In operation 300, one or more processors (e.g., 216 of FIG. 2), at the intermediate routing device (e.g., 210 of FIG. 2), may receive the data packet (e.g., 102 of FIG. 1A) comprising a packet header (e.g., 106 of FIG. 1A) and a data payload (e.g., 118 of FIG. 1A). The packet header may comprise at least an encrypted final destination address (e.g., 114 of FIG. 1A) of the final destination device (e.g., 250 of FIG. 2) that may be homomorphically encrypted by one or more public homomorphic encryption keys. One or more memories (e.g., 218 of FIG. 2) in a non-trusted execution environment (non-TEE) (e.g., 214 of FIG. 2) of the intermediate routing device (e.g., 210 of FIG. 2) may store the homomorphically encrypted final destination address (e.g., 114 of FIG. 1B).

In operation 310, one or more processors (e.g., 216 of FIG. 2) in the non-TEE of the intermediate routing device may perform homomorphic computations (e.g., 120 of FIG. 1B) on the homomorphically encrypted final destination address in homomorphically encrypted space to determine a homomorphically encrypted address (e.g., 122 of FIG. 1B) of a next intermediate routing device in the sequence to route the data packet. For example, the homomorphic computations may include searching a HE routing table. In some embodiments, the final destination address and the address of the next intermediate routing device may be homomorphically encrypted with the same one or more public homomorphic encryption keys.

In some embodiments, the one or more memories in the non-TEE may persistently store a homomorphically encrypted partial final destination address, but not the complete final destination address in either encrypted or unencrypted form. The one or more processors in the non-TEE of the intermediate routing device may perform homomorphic computations on the homomorphically encrypted partial final destination address. The partial final destination address may be a minimum portion of the complete final destination address required to determine the address of the next intermediate routing device. The partial final destination address may be one of N-tuples of the complete final destination address.

In operation 320, one or more memories (e.g., 217 of FIG. 2) in a trusted execution environment (TEE) (e.g., 215 of FIG. 2) of the intermediate routing device may store one or more secret homomorphic decryption keys (e.g., 126 of FIG. 1B). In some embodiments, the final destination address and the address of the next intermediate routing device may be homomorphically encrypted with different respective one or more public homomorphic encryption keys and the one or more secret homomorphic decryption keys stored at the one intermediate routing device may be configured to decrypt the homomorphically encrypted address of the next intermediate routing device address but not the homomorphically encrypted final destination address.

In operation 330, one or more processors (e.g., 219 of FIG. 2) in the TEE (e.g., 215 of FIG. 2) of the intermediate routing device (e.g., 210 of FIG. 2) may decrypt the homomorphically encrypted address of the next intermediate routing device in the sequence to generate an unencrypted address of the next intermediate routing device (e.g., 128 of FIG. 1B). In some embodiments, one or more memories (e.g., 217 of FIG. 2) in respective TEEs of the one and the next intermediate routing devices may store different one or more secret homomorphic decryption keys, and the one intermediate device may encrypt the updated packet header (e.g., 127 of FIG. 1B) using one or more public homomorphic encryption keys associated with the one or more secret homomorphic decryption keys stored at the next intermediate routing device. In some embodiments, the unencrypted address of the next intermediate routing device in the updated packet header may be a hash of the unencrypted address.

In operation 340, one or more processors (e.g., 219 of FIG. 2) of the intermediate routing device (e.g., 210 of FIG. 2) may transmit the data packet to the decrypted address of the next intermediate routing device according to the updated packet header with the unencrypted address of the next intermediate routing device in the sequence. In some embodiments, the one or more processors may wait to decrypt the address of the next intermediate routing device or transfer the decrypted address to the non-TEE, until the TEE determines and/or receives a signal indicating that transmitting the data packet will have no or below threshold processing or transmission delays outside the TEE.

Other or additional operations may be executed in the same or different order.

Embodiments of the invention may include an article such as a non-transitory computer or processor readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

In the above description, an embodiment is an example or implementation of the inventions. The various appearances of "one embodiment," "an embodiment" or "some embodiments" do not necessarily all refer to the same embodiments. Although various features of the invention may be described in the context of a single embodiment, the features of embodiments may also be provided separately or in any suitable combination. Conversely, although the invention may be described herein in the context of separate embodiments for clarity, the invention may also be implemented in a single embodiment. Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

The descriptions, examples, methods and materials presented in the claims and the specification are not to be construed as limiting but rather as illustrative only. While certain features of the present invention have been illustrated and described herein, many modifications, substitutions, changes, and equivalents may occur to those of ordinary skill in the art. It is, therefore, to be understood that the appended claims are intended to cover all such modifications and changes as fall with the true spirit of the invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Different embodiments are disclosed herein. Features of certain embodiments may be combined with features of other embodiments; thus certain embodiments may be combinations of features of multiple embodiments. Accordingly, the scope of the invention should not be limited by what has thus far been described, but by the appended claims and their legal equivalents.

The invention claimed is:

1. A method for privacy preserving routing of a data packet originating at a source device, forwarded through a sequence of intermediate routing devices, and destined to terminate at a final destination device, the method comprising:

at one of the intermediate routing devices:
receiving the data packet comprising a packet header and a data payload, the packet header comprising at least a final destination address of the final destination device that is homomorphically encrypted by one or more public homomorphic encryption keys;

in a non-trusted execution environment (non-TEE), performing homomorphic computations on the homomorphically encrypted final destination address in homomorphically encrypted space to determine a homomorphically encrypted address of a next intermediate routing device in the sequence to route the data packet;

storing in a trusted execution environment (TEE) one or more secret homomorphic decryption keys;

at the TEE, decrypting the homomorphically encrypted address of the next intermediate routing device in the sequence to generate an unencrypted address of the next intermediate routing device; and transmitting the data packet to the decrypted address of the next intermediate routing device according to an updated packet header with the unencrypted address of the next intermediate routing device in the sequence.

2. The method of claim 1 comprising, at the TEE, waiting to decrypt the address of the next intermediate routing device or transfer the decrypted address to the non-trusted execution environment, until the TEE determines or receives a signal indicating that transmitting the data packet will have no or below threshold delays.

3. The method of claim 1 comprising, at the non-trusted execution environment, persistently storing a homomorphically encrypted partial final destination address, but not the complete final destination address in either encrypted or unencrypted form, wherein the homomorphic computations are performed on the homomorphically encrypted partial final destination address.

4. The method of claim 3, wherein the partial final destination address is a minimum portion of the complete final destination address required to determine the address of the next intermediate routing device.

5. The method of claim 4, wherein the partial final destination address is one of N-tuples of the complete final destination address.

6. The method of claim 1, wherein the one and next intermediate routing devices store different one or more secret homomorphic decryption keys; comprising encrypting the updated packet header using one or more public homomorphic encryption keys associated with the one or more secret homomorphic decryption keys stored at the next intermediate routing device.

7. The method of claim 1, wherein the final destination address and the address of the next intermediate device are homomorphically encrypted with the same one or more public homomorphic encryption keys.

8. The method of claim 1, wherein the final destination address and the address of the next intermediate routing device are homomorphically encrypted with different respective one or more public homomorphic encryption keys and the one or more secret homomorphic decryption keys stored at the one intermediate routing device is configured to decrypt the homomorphically encrypted address of the next intermediate routing device address but not the homomorphically encrypted final destination address.

9. The method of claim 1, wherein the unencrypted address of the next intermediate routing device in the updated packet header is a hash of the unencrypted address.

10. An intermediate routing device in a sequence of intermediate routing devices configured for privacy preserving routing of a data packet originating at a source device, forwarded through the sequence of intermediate routing devices, and destined to terminate at a final destination device, the intermediate routing device comprising:

one or more processors in a non-trusted execution environment (non-TEE) configured to:
receive the data packet comprising a packet header and a data payload, the packet header comprising at least a final destination address of the final destination device that is homomorphically encrypted by one or more public homomorphic encryption keys,
perform homomorphic computations on the homomorphically encrypted final destination address in homomorphically encrypted space to determine a homomorphically encrypted address of a next intermediate routing device in the sequence to route the data packet; and one or more processors in a trusted execution environment (TEE) configured to:
store one or more secret homomorphic decryption keys,
decrypt the homomorphically encrypted address of the next intermediate routing device in the sequence to generate an unencrypted address of the next intermediate routing device,
wherein the one or more processors in the non-TEE are configured to transmit the data packet to the decrypted address of the next intermediate routing device according to an updated packet header with the unencrypted address of the next intermediate routing device in the sequence.

11. The intermediate routing device of claim 10, wherein the one or more processors in the TEE are configured to wait to decrypt the address of the next intermediate routing device or transfer the decrypted address to the non-trusted execution environment, until the one or more processors in the TEE determines or receives a signal indicating that transmitting the data packet will have no or below threshold delays.

12. The intermediate routing device of claim 10, wherein the one or more processors in the non-TEE are configured to persistently store a homomorphically encrypted partial final destination address, but not the complete final destination address in either encrypted or unencrypted form, and to perform the homomorphic computations on the homomorphically encrypted partial final destination address.

13. The intermediate routing device of claim 12, wherein the partial final destination address is a minimum portion of the complete final destination address required to determine the address of the next intermediate routing device.

14. The intermediate routing device of claim 13, wherein the partial final destination address is one of N-tuples of the complete final destination address.

15. The intermediate routing device of claim 10, wherein at the one and next intermediate routing devices, one or more memories in respective TEEs are configured to store different one or more secret homomorphic decryption keys, and the one or more processors in the TEE of the one intermediate routing device are configured to encrypt the updated packet header using one or more public homomorphic encryption keys associated with the one or more secret homomorphic decryption keys stored at the next intermediate routing device.

16. The intermediate routing device of claim 10, wherein the final destination address and the address of the next intermediate routing device are homomorphically encrypted with the same one or more public homomorphic encryption keys.

17. The intermediate routing device of claim 10, wherein the final destination address and the address of the next intermediate routing device are homomorphically encrypted with different respective one or more public homomorphic encryption keys and the one or more secret homomorphic decryption keys stored at the one intermediate routing device is configured to decrypt the homomorphically encrypted next intermediate routing device address but not the homomorphically encrypted final destination address.

18. The intermediate routing device of claim 10, wherein the unencrypted address of the next intermediate routing device in the updated packet header is a hash of the unencrypted address.

19. A non-transitory computer readable storage medium for privacy preserving routing of a data packet originating at a source device, forwarded through a sequence of intermediate routing devices, and destined to terminate at a final destination device, the computer readable storage medium having instructions stored thereon, which when executed by one or more processors, cause the processors to:
   receive the data packet comprising a packet header and a data payload, the packet header comprising at least a final destination address of the final destination device that is homomorphically encrypted by one or more public homomorphic encryption keys;
   in a non-trusted execution environment (non-TEE), perform homomorphic computations on the homomorphically encrypted final destination address in homomorphically encrypted space to determine a homomorphically encrypted address of a next intermediate routing device in the sequence to route the data packet;
   store in a trusted execution environment (TEE) one or more secret homomorphic decryption keys;
   at the TEE, decrypt the homomorphically encrypted address of the next intermediate routing device in the sequence to generate an unencrypted address of the next intermediate routing device; and
   transmit the data packet to the decrypted address of the next intermediate routing device according to an updated packet header with the unencrypted address of the next intermediate routing device in the sequence.

20. The non-transitory computer readable storage medium of claim 19 having further instructions stored thereon, which when executed by the one or more processors, cause the processors to, at the TEE, wait to decrypt the address of the next intermediate routing device or transfer the decrypted address to the non-trusted execution environment, until the TEE determines or receives a signal indicating that transmitting the data packet will have no or below threshold delays.

* * * * *